United States Patent [19]

Barlow et al.

[11] Patent Number: 5,601,082
[45] Date of Patent: Feb. 11, 1997

[54] MEDICAL ULTRASOUND IMAGING

[75] Inventors: Christopher J. Barlow, Etobicoke, Canada; Robert J. Dickinson; Richard I. Kitney, both of London, England

[73] Assignee: Intravascular Research Limited, London, England

[21] Appl. No.: 537,589

[22] Filed: Oct. 2, 1995

[30] Foreign Application Priority Data

Sep. 30, 1994 [GB] United Kingdom ............... 9419778

[51] Int. Cl.⁶ ........................................ A61B 8/00
[52] U.S. Cl. ........................ 128/660.07; 128/662.06
[58] Field of Search ................. 128/660.01, 660.07, 128/660.08, 660.09, 661.01, 662.05, 662.06; 73/602, 607, 625, 626, 630

[56] References Cited

U.S. PATENT DOCUMENTS

| | | | |
|---|---|---|---|
| 4,899,757 | 2/1990 | Pope, Jr. et al. | |
| 5,103,427 | 4/1992 | Erdol et al. | 128/660.01 |
| 5,183,048 | 2/1993 | Eberle. | |
| 5,379,642 | 1/1995 | Reckwerdt et al. | 73/625 |
| 5,404,754 | 1/1995 | Wang | 73/602 |

FOREIGN PATENT DOCUMENTS

| | | |
|---|---|---|
| 2212267 | 7/1989 | United Kingdom. |
| 2233094 | 1/1991 | United Kingdom. |
| 2268806 | 1/1994 | United Kingdom. |

*Primary Examiner*—George Manuel
*Attorney, Agent, or Firm*—Richard M. Goldberg

[57] ABSTRACT

A method of overcoming the ring down problem comprises the steps of generating a reference scan and updating it on the basis of a long term running average and then subtracting that running average from the current A-scan to remove the ring down.

19 Claims, 4 Drawing Sheets

MEDICAL ULTRASOUND IMAGING

The present invention relates to medical ultrasound imaging.

In UK Patent Nos. 2,212,267 and 2,233,094 the patentees disclose ultrasound imaging systems for producing 3-dimensional and 2-dimensional images respectively of human internal organs.

In these systems a catheter is provided at its distal end with a ceramic piezo-electric transducer array for generating ultrasonic signals and for receiving their echoes from which a visual representation is obtained.

Typically, such catheters are designed for insertion into an artery of the patient and the 2-dimensional and/or 3-dimensional images obtained are of the interior of the artery.

There is a problem with such ultrasound arrangements in that a dead space or blind spot, as far as the imaging is concerned, exists in the immediate vicinity of the transducer array. This is caused by the fact that the mechanical vibration of the transducer elements to produce the ultrasonic images takes some time to die down after having been energised by an energisation pulse. This time is sufficiently long for the energisation vibration to interfere with the vibration of the crystal caused by the returning echo signal. This phenomenon is sometimes referred to as "ringdown". The time it takes for the transducer element to stop vibrating as a result of its initial energisation is also sometimes referred to as the "ringdown" time.

This phenomenon is described, for example, in U.S. Pat. No. 4,899,757 and one solution to the "ringdown" problem is disclosed in that patent.

The arrangement disclosed in U.S. Pat. No. 4,899,757 deals with this "ringdown" problem by including the "dead space" within the catheter itself. In other words the initial path of the outgoing ultrasound signal and the final part of the path of the incoming echo signal are both contained within the catheter itself. It is thus possible with such an arrangement for any target, such as the interior wall of a blood vessel, to be visualised even though that target is immediately adjacent to or in contact with the external surface of the catheter.

Another solution to this problem is disclosed in U.S. Pat. No. 5,183,048. In that patent an electronic solution is employed rather than the mechanical solution of U.S. Pat. No. 4,899,757. More particularly, in U.S. Pat. No. 5,183,048 a reference signal having no echoes is subtracted from the signal received when the transducer is in its normal operating position. However, there are two problems with this approach. In order to obtain the reference signal the transducer must be operated in an area where there are no echoes. In order to do this the transducer would have to be withdrawn from the patient's artery (where it is desired to obtain images of the interior of the artery) and positioned in a relatively large vessel such as the aorta where there would be no echo signals because the walls of that vessel are sufficiently far away from the transducer. As a practical matter this can cause difficulties.

The second problem is that the ringdown can drift with time so that the reference signal/scan needs to be re-acquired at periodic intervals and this again causes further inconvenience particularly as the tip of the catheter would have to be withdrawn from the target artery and reinserted, from time to time, into the patient's aorta.

The present invention is concerned with providing an improvement on the general approach disclosed in U.S. Pat. No. 5,183,048.

According to the present invention a method of overcoming the ringdown problem comprises generating a reference scan, updating the said reference scan on the basis of a long term running average and then subtracting that running average from the current A-scan to remove the ringdown.

The present invention is based on the discovery that although the echoes obtained will vary significantly from scan to scan the ringdown will only vary slowly.

How the invention may be carried out will now be described by way of example only and with reference to the accompanying drawings in which:

FIG. 1 is a block diagram of a digitally based ultrasound processor as disclosed in our UK Patent No. 2,212,267 and is equivalent to FIG. 1 of that patent. The contents of the patent specification are incorporated herein by reference.

FIG. 1 is a block diagrammatic representation of a method and apparatus for providing an image of the interior of a human organ particularly an artery.

Figure 1:
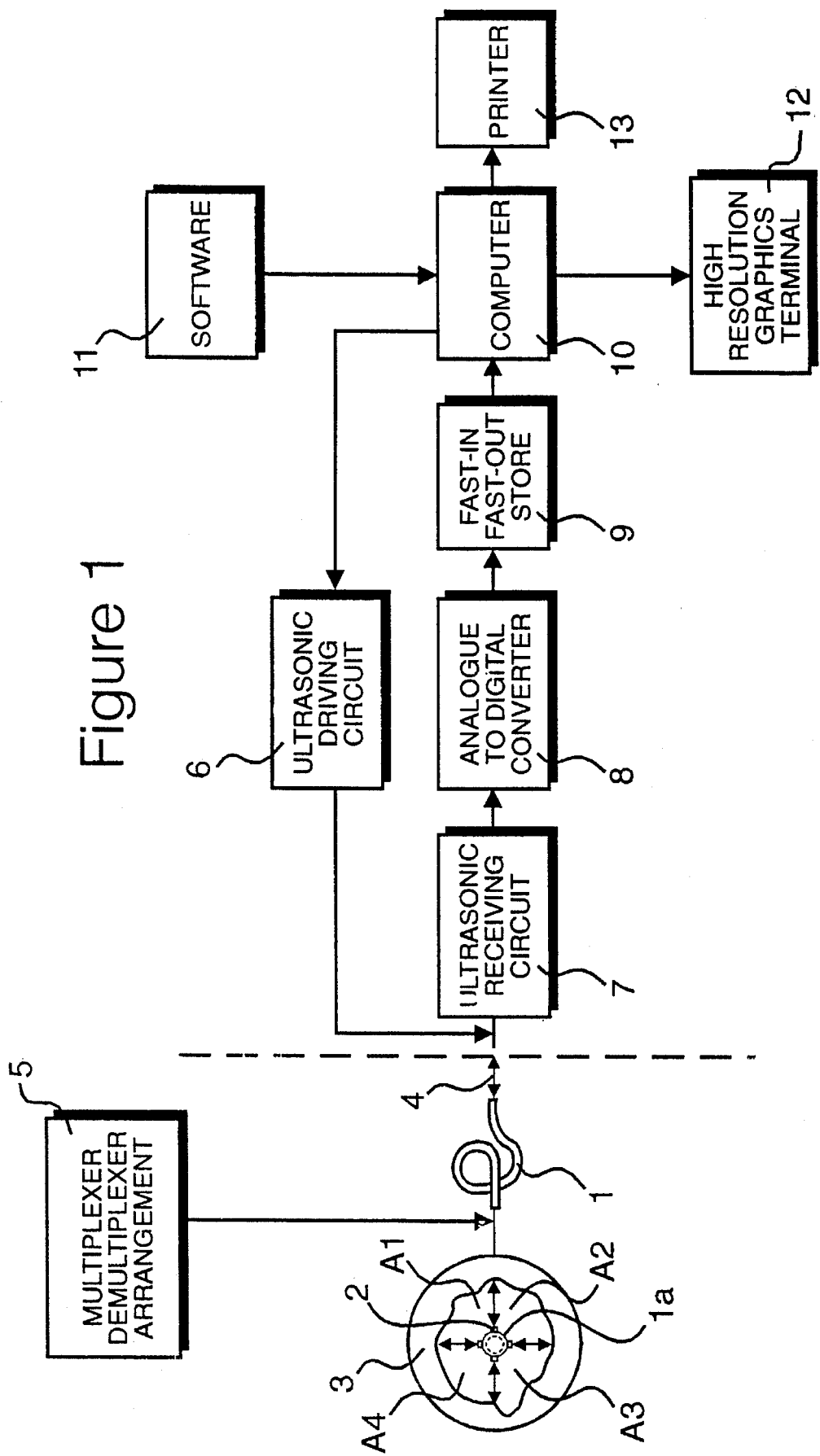
FIG. 1 is a block diagram illustrating a system to which the present invention can be applied.

A catheter 1 for insertion into a human artery 3 has a free end 1a on which is mounted an annular ultrasonic transducer assembly 2, the other end of the catheter being electrically connected by connection 4 to the equipment shown to the right of the broken line in FIG. 1.

The electrical connection 4 includes a wiring arrangement which acts as a multiplexer/demultiplexer 5 which functions to reduce the number of wires which would otherwise need to pass through catheter 1 in order to connect the transducer assembly 2 to the equipment illustrated diagrammatically to the right of the broken line in FIG. 1.

The transducer assembly 2 is energised by a driving circuit 6 to cause the transducer assembly 2 to emit ultrasonic signals. The transducer assembly 2 responds to echoes of the emitted signals and this causes the generation of echo signals which pass back to the multiplexer/demultiplexer arrangement 5 to an ultrasonic receiving circuit 7 and then to an analogue-to-digital converter 8 which translates the analogue electrical echo signals into digital signals.

These digital echo signals are then fed to a fast-in-fast-out data store 9 from whence they are fed into a digital computer 10.

The digital computer 10 is programmed by means of software 11 in suck a way that the digital echo signals are transformed into signals which when fed to a high resolution graphics display terminal 12 will enable a two-dimensional read-time representation or a three-dimensional representation of the interior of the artery 3 to be displayed.

A hard copy of the representation can be obtained by means of a printer 13.

Figure 2:
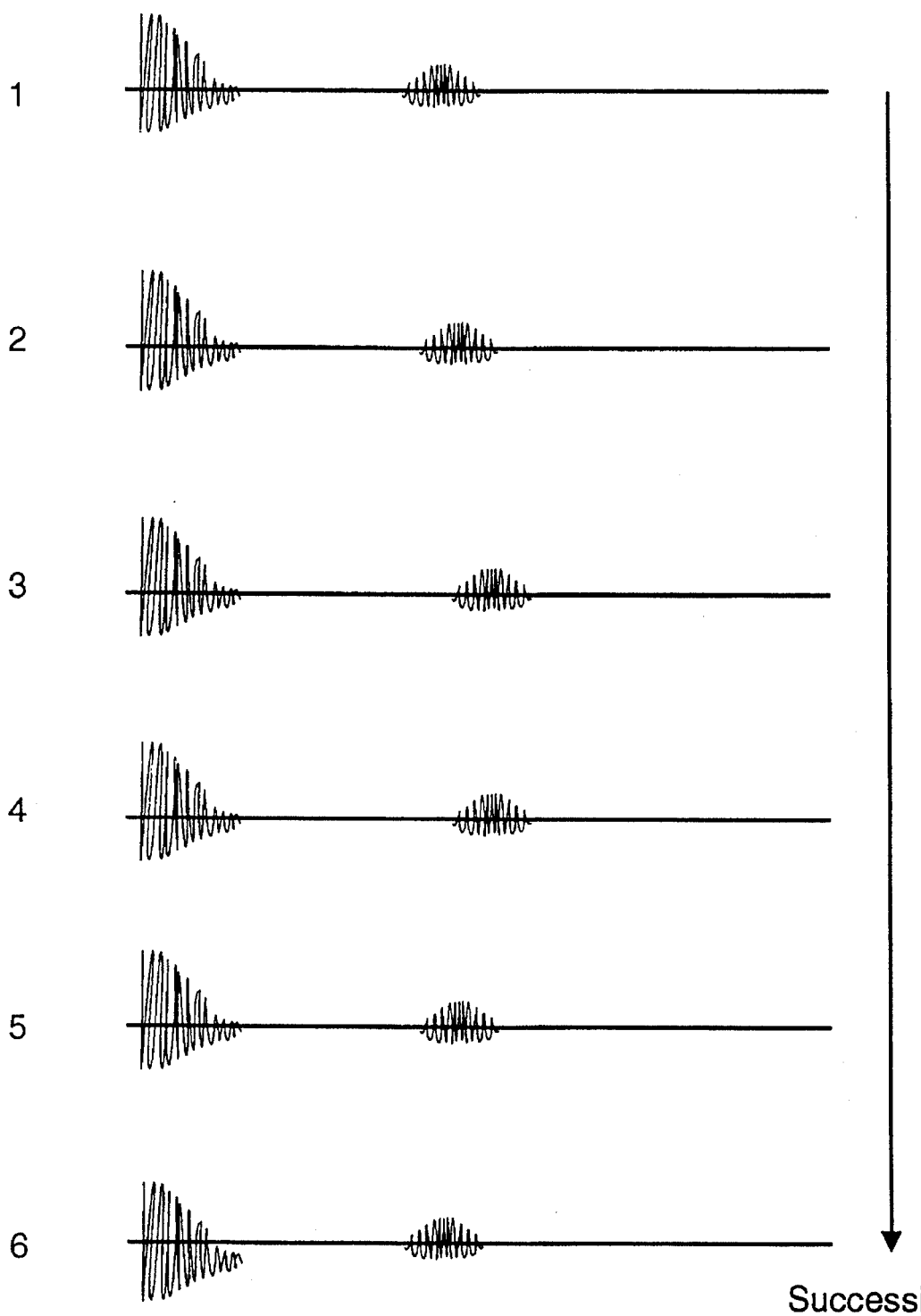
FIG. 2 illustrates the ringdown problem.

Referring to FIG. 2, the ultrasound echo signal, or A-scan, contains a component that is due to decaying vibration of the transducer following its initial excitation. This is the so-called ringdown. This vibration can persist for 1–2 micro seconds after the initial transmit pulse and can obscure the presence of echoes within 1–2 micro seconds of the transducer. This is illustrated diagrammatically in FIG. 2 which shows six successive frames of the same A-scan.

It is desirable to remove this ringdown as it produces an undesirable central blind spot in the image and it obscures echoes close to the transducer and various solutions proposed as described earlier.

In the solution proposed in U.S. Pat. No. 5,183,048 a reference signal with no echoes is acquired and subsequent A-scans are subtracted from it.

This can be expressed mathematically thus:

$$A_i(t) = r_i(t) + s_i(t)$$ (Equation 1)
A-scan = ringdown plus echo $$R(t) = r(t)$$ (Equation 2)
Reference = scan taken in region without echoes $$P_i(t) = A_i(t) - R(t) = s(t)$$ (Equation 3)
Corrected scan = Acquired scan − Reference scan echoes There are two problems with this technique. The reference scans require a field in which there are no echoes, typically in a large vessel such as the aorta, and this can be difficult to obtain. Secondly the ringdown r(t) can drift with time, so the reference scan needs re-acquiring at periodic intervals, which is inconvenient.

The solution of the present invention is based on the realisation that whilst the ultrasound echoes will vary significantly from scan to scan the ringdown will only vary slowly.

The echo will depend on the position and orientation of tissue structure relative to the transducer, and will thus change from scan to scan with movement of the tissue, due to the pulsatile motion of arteries. This motion has frequency components related to the pulse rate, typically in the range 1–10 Hz. The ringdown on the other hand is intrinsic to the transducer element, and independent of the position of neighbouring tissue, and will change due to resonant properties, caused predominantly by small temperature drifts. These changes occur over time-scales of several minutes, and thus are of a significantly different time-scale to the time-scale of echo variation, which latter variation is illustrated in FIG. 2.

Thus the reference scan can be updated by taking a relatively long term running average which can be expressed in the following mathematical terms.

$$R_i(t) = \text{Average }(A_i(t))$$ (Equation 4)
$$= \alpha A_i(t) + (1-\alpha)R_{i-1}(t)$$

and this running average can be subtracted from the current A-scan to remove the ringdown.

$$P_i(t)=A_i(t)-\{\alpha A_i(t)+(1-\alpha)R_{i-1}(t)\}$$ (Equation 5)

Figure 3:
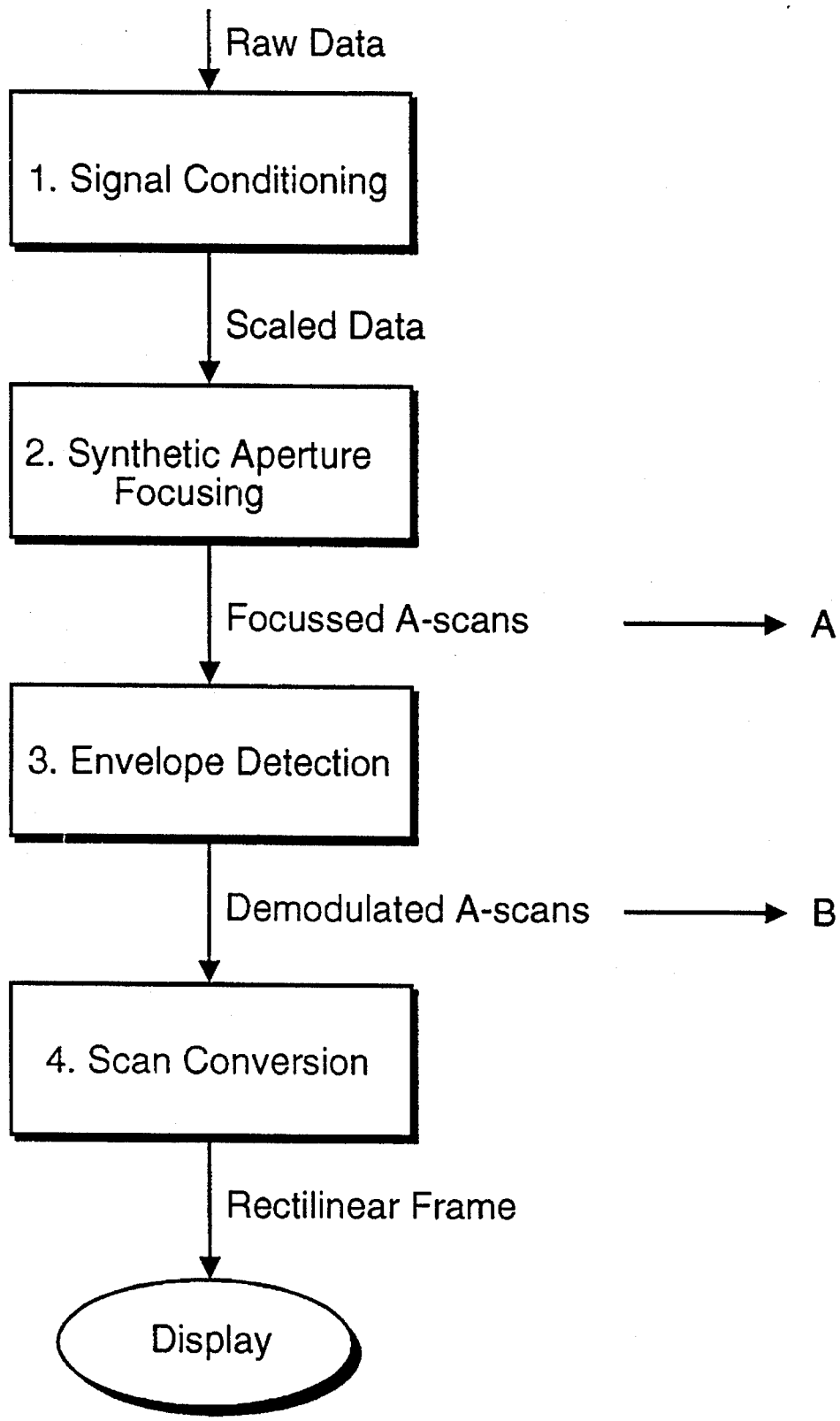
FIG. 3 is a flow diagram illustrating the digital processing stages used in the system of FIG. 1.
Figure 4:
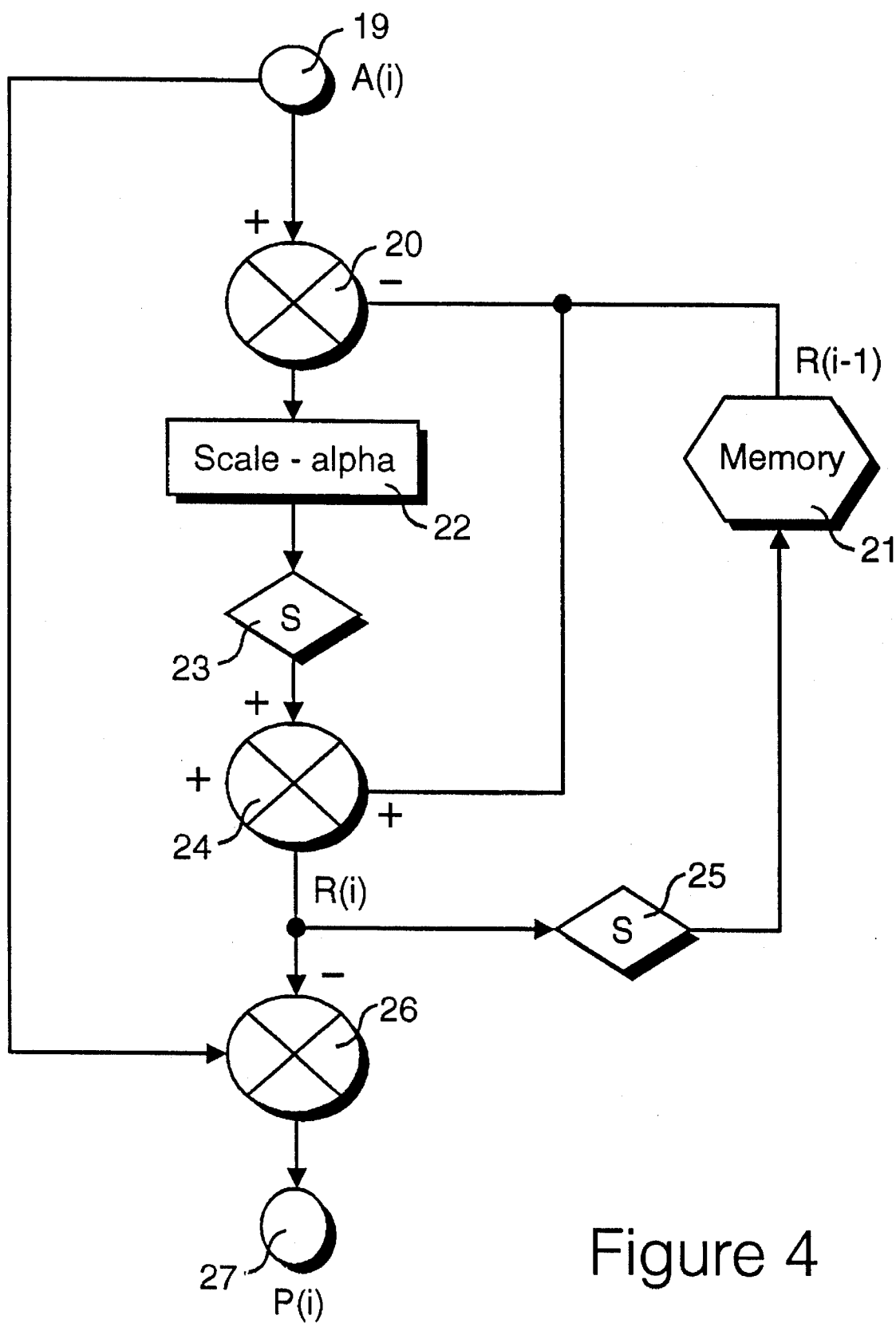
FIG. 4 is a flow diagram of one embodiment of the present invention.

How this method can be implemented is shown diagrammatically in FIGS. 3 and 4.

The processing of the ultrasound pulses can be considered as a pipeline of four main stages as shown in FIG. 3.

The first stage is signal conditioning, such as d.c. correction, normalisation and digital filtering.

The second stage is combining channels to perform synthetic aperture focusing.

The third stage is envelope detection, to extract tissue reflectivity from the ultrasound radio-frequency carrier The fourth stage is scan conversion, to convert the radial information to a form suitable for display on a conventional rectilinear or rastor display device 18, including interpolation between rays as appropriate.

In our UK Patent Nos 2,233,094 and 2,268,806, equipment to perform this processing is disclosed, based on a high-performance workstation. Our copending patent application No. 9418630 also discloses equipment to perform this processing in a dedicated parallel digital signal processing card, prior to steps 3 and 4 of FIG. 3 which are performed in the host workstation.

FIG. 4 discloses how the recursive algorithms of Equation 5 can be implemented as a recursive filter, which can be inserted into the pipeline of FIG. 3. The filter consists of three adder units 20, 24, 26, a memory 21, and a multiplier unit 22. There is one filter for each data point in a frame of data. This filter can be inserted at any stage in the processing pipeline of FIG. 3, the most efficient implementations are when the data is at the minimum size, which is before scan conversion, either just after focusing or after demodulation, at points A & B in FIG. 3.

The filter can be implemented in digital hardware using known circuit components. In the preferred implementation it is implemented by the central Processing Unit of the workstation 12 of FIG. 1 under stored program control. This has the advantage that the parameter $\alpha$, which determines how the filter separates variations of different timescales, can be changed readily.. In one implementation the parameter $\alpha$ can be set automatically, by evaluating the frequency components of motion.

First a spectral analysis of the temporal frequency components is obtained (Equation 5). The parameter $\alpha$ is then set to discriminate between the low frequency components associated with ringdown, and the high frequency components associated with motion, using a suitable algorithm.

The preferred algorithm is to search for the frequency $F_1$ at which the power spectrum falls below a certain threshold, and the frequency $F_2$ at which it rises above that threshold. The discriminating frequency $F_\alpha$ is set at the arithmetic mean of $F_1$ and $F_2$.

In certain circumstances it is an advantage to stop the updating of the ringdown signal, for example, in cases when the time dependence of the echo signals is similar to that of the ridgdown signal. One such case is when the transducer is imaging a stationary object such as a calibration phantom. The updating can then be interrupted by interrupting the data flow at the two points 23 and 25 in FIG. 4. This situation is closer to that of the simple subtraction of a fixed reference signal as in Equation 3. The difference is that the reference signal was obtained by a process of running average, not by a single scan in an echo-free zone.

The ability to be able to interrupt the updating of the reference scan is valuable in the use of preventing erroneous data being fed into the reference scan, for example, when the transducer is being moved into position, and spends long periods against a vessel wall. In these circumstances the vessel wall signal will be only slowly varying, and will be added to the references scan. Interrupting the updating prevents this artifact occurring during positioning of the transducer.

The updating of the reference scan normally starts from zero, and so a significant number of frames are required for the contents of the reference scan to approach the ringdown only signal. In another implementation of this technique an echo free signal is obtained in a suitable large vessel and fed into the long-term memory to act as an initialisation condition, and then updating is continued by the method described.

We claim:

1. A method of overcoming a ringdown problem when operating an ultrasonic imaging system for imaging internal organs of a human body in which ultrasonic signals are transmitted and echoes thereof received, comprising the steps of:

generating a reference scan, updating said reference scan to be equal to a long term running average of scans, and then subtracting said running average from a current A-scan to remove the ringdown.

2. A method as claimed in claim 1 in which said step of generating a reference scan includes the step of generating a reference scan having no echoes.

3. A method as claimed in claim 2 further comprising the step of obtaining the long term running average by use of simple order recursive filtering.

4. A method as claimed in claim 2 in which said step of updating updates said reference scan to be equal to said long term running average of scans, over a period which is significantly greater than a period between consecutive scans.

5. A method as claimed in claim 1 in which said step of generating a reference scan includes the step of generating a reference scan by calculating a long term average which eliminates the echoes.

6. A method as claimed in claim 5 further comprising the step of obtaining the long term running average by use of simple order recursive filtering.

7. A method as claimed in claim 1 further comprising the step of obtaining the long term running average by use of simple order recursive filtering.

8. A method as claimed in claim 1 in which said step of updating updates said reference scan to be equal to said long term running average of scans, over a period which is significantly greater than a period between consecutive scans.

9. In an ultrasonic system for imaging internal organs of an internal body by employing a transducer array mounted on a distal end of a catheter, means for overcoming a "ringdown" problem comprises:

(a) means for obtaining a reference scan having no echoes;

(b) means for subtracting the reference scan from an acquired scan to produce a corrected scan; and (c) means for updating the reference scan to be equal to a running average of scans over a period which is significantly greater than a period between consecutive scans.

10. Apparatus as claimed in claim 9 further comprising a long term memory under program control to store said acquired scan.

11. Apparatus as claimed in claim 10 further including means for temporarily interrupting the updating of the reference scan when the transducer array is imaging a stationary object.

12. Apparatus as claimed in claim 10 further comprising means for automatically setting a value of $\alpha$ as defined by Equations as follows:

$$R_i(t)=\alpha A_i(t)+(1-\alpha)R_{i-1}(t) \text{ and}$$

$$P_i(t)=A_i(t)-\{\alpha A_i(t)+(1-\alpha)R_{i-1}(t)\},$$

where $R_i(t)$ is the reference scan, $P_i(t)$ is the corrected scan, $A_i(t)$ is an A-scan and $\alpha$ is a parameter for discriminating between low frequency components associated with ringdown and high frequency components associated with motion of the transducer array.

13. Apparatus as claimed in claim 10 further comprising a recursive filter arrangement, which is adapted to implement a recursive algorithm set out in an Equation as follows:

$$P_i(t)=A_i(t)-\{\alpha A_i(t)+(1-\alpha)R_{i-1}(t)\},$$

where $R_i(t)$ is the reference scan, $P_i(t)$ is the corrected scan and $A_i(t)$ is an A-scan.

14. Apparatus as claimed in claim 9 further including means for temporarily interrupting the updating of the reference scan when the transducer array is imaging a stationary object.

15. Apparatus as claimed in claim 14 further comprising means for automatically setting a value of $\alpha$ as defined by Equations as follows:

$$R_i(t)=\alpha A_i(t)+(1-\alpha)R_{i-1}(t) \text{ and}$$

$$P_i(t)=A_i(t)-\{\alpha A_i(t)+(1-\alpha)R_{i-1}(t)\},$$

where $R_i(t)$ is the reference scan, $P_i(t)$ is the corrected scan, $A_i(t)$ is an A-scan and $\alpha$ is a parameter for discriminating between low frequency components associated with ringdown and high frequency components associated with motion of the transducer array.

16. Apparatus as claimed in claim 14 further comprising a recursive filter arrangement, which is adapted to implement a recursive algorithm set out in an Equation as follows:

$$P_i(t)=A_i(t)-\{\alpha A_i(t)+(1-\alpha)R_{i-1}(t)\},$$

where $R_i(t)$ is the reference scan, $P_i(t)$ is the corrected scan and $A_i(t)$ is an A-scan.

17. Apparatus as claimed in claim 9 further comprising means for automatically setting a value of $\alpha$ as defined by Equations as follows:

$$R_i(t)=\alpha A_i(t)+(1-\alpha)R_{i-1}(t) \text{ and}$$

$$P_i(t)=A_i(t)-\{\alpha A_i(t)+(1-\alpha)R_{i-1}(t)\},$$

where $R_i(t)$ is the reference scan, $P_i(t)$ is the corrected scan, $A_i(t)$ is an A-scan and $\alpha$ is a parameter for discriminating between low frequency components associated with ringdown and high frequency components associated with motion of the transducer array.

18. Apparatus as claimed in claim 9 further comprising a recursive filter arrangement, which is adapted to implement a recursive algorithm set out in an Equation as follows:

$$P_i(t)=A_i(t)-\{\alpha A_i(t)+(1-\alpha)R_{i-1}(t)\},$$

where $R_i(t)$ is the reference scan, $P_i(t)$ is the corrected scan and $A_i(t)$ is an A-scan.

19. Apparatus as claimed in claim 9 further comprising a recursive filter arrangement, which is adapted to implement a recursive algorithm set out in an Equation as follows:

$$P_i(t)=A_i(t)-\{\alpha A_i(t)+(1-\alpha)R_{i-1}(t)\},$$

where $R_i(t)$ is the reference scan, $P_i(t)$ is the corrected scan and $A_i(t)$ is an A-scan.

* * * * *